United States Patent Office 3,112,287
Patented Nov. 26, 1963

3,112,287
VINYL CHLORIDE-VINYLIDENE CHLORIDE COPOLYMER COATINGS MODIFIED WITH PARTIALLY SAPONIFIED, PARTIALLY DEHYDROHALOGENATED COPOLYMERS OF VINYL CHLORIDE AND VINYL ACETATE
Henry J. Bach, Mount Lebanon Township, Allegheny County, and Edward J. Esswein, Jr., Pittsburgh, Pa., assignors, by mesne assignments, to Mobil Finishes Company, Inc., New York, N.Y., a corporation of Delaware
No Drawing. Filed Mar. 10, 1958, Ser. No. 720,065
12 Claims. (Cl. 260—33.6)

The present invention relates to improved vinyl chloride-vinylidene chloride copolymer containing coating compositions which possess enhanced sanitary can coating characteristics coupled with improved thermal stability. The invention includes the new coating compositions in solvent solution and also the coated products which may be produced using the new coating compositions.

The compositions of the invention can be baked at relatively low temperatures to achieve enhanced adhesion and blush resistance. These compositions provide increased safety against scorching and similar thermal deterioration which occurs when the coated product is baked for an excessive period of time or when the baking temperature inadvertently exceeds the predetermined desired baking temperature.

In accordance with the present invention, an alkaline saponified copolymer of vinyl chloride and vinyl acetate produced by suspension hydrolysis in an alcoholic medium is incorporated in minor proportion in a coplymer of vinyl chloride with vinylidene chloride to provide coatings which, upon baking, exhibit improved dry adhesion and also improved wet adhesion after subjection to pasteurizing conditions. The invention includes compositions comprising copolymers of vinyl chloride with vinylidene chloride and alkaline saponified copolymer of vinyl chloride and vinyl acetate, as above indicated, together with a small proportion of a solvent-soluble etherified low molecular weight amine resin, such as butylated trimethylol melamine, to further improve the thermal stability of the composition and coatings produced therefrom. The inclusion of the etherified low molecular weight amine resin also contributes to increased adhesion to baked rosin-based oleoresinous varnish priming compositions as well as im roved blush resistance over baked oleoresinous phenol-aldehyde varnish priming compositions.

The invention still further includes the use of polyepoxides with vinyl chloride-vinylidene chloride copolymer mixtures with suspension saponified vinyl chloride-vinyl acetate copolymers and in conjunction with the previously referred to amine resin containing mixtures. Polyepoxides in small amounts function to prevent thermal decomposition when the coatings are baked at higher baking temperatures. The inclusion of the polyepoxide also provides improved adhesion and particularly improved dry adhesion on fabrication of the coated base.

Special sanitary coatings for food and beverage containers have been developed which have proved satisfactory in some respects, but their use has been limited by deficiences in other respects. Vinyl halide polymers, for example, have fair thermal stability but poor adhesion and solubility characteristics.

Copolymers of vinyl chloride and vinyl acetate have better solubility characteristics in the more active solvents, such as ketone and ester solvents, and comparable adhesion but poorer thermal stability. The latter difficulties may be overcome to some extent as indicated in the United States patent to Maier No. 2,380,546, where vinyl resins are modified with an oleoresinous varnish modifier. However, vinyl halide polymers and copolymers of vinyl chloride and vinyl acetate, whether or not modified as indicated in the Maier patent, are substantially insoluble in aromatic hydrocarbon solvents, which are relatively inexpensive and therefore desirable solvents to use for practical purposes. Specifically, aromatic hydrocarbon solvents, even when they contain as much as 30% active solvent in admixture with the aromatic hydrocarbon solvent, do not provide suitable coating viscosity when these solutions contain more than about 20% by weight of resin solids. Moreover, the inclusion of the oleoresinous varnish, which is of the phenolic type results in a taste problem, the oleoresinous varnish component imparting its flavor to the foods and beverages which are packaged within the can.

Copolymers of vinyl chloride and vinylidene chloride have better solubility in aromatic solvents, particularly when the copolymer contains from 30–75% by weight of vinyl chloride and vinylidene chloride. However, these copolymers of vinyl chloride and vinylidene chloride are inadequate for the production of effective sanitary coating (can) compositions in certain respects. First, dry adhesion is poor, specifically, the adhesion to unprimed tinplate has a value of about 3 on the basis of 10 being perfect. Wet adhesion after pasteurization in water at 170° F. for a period of 45 minutes is poor, in some instances a score of zero being obtained. The resistance of the baked coating to blush is also poor. The thermal stability of copolymers of vinyl chloride and vinylidene chloride is also poor. For example, the maximum temperature at which the coating upon electrolytic tinplate may be exposed for a period of ten minutes before visible decomposition takes place is 300° F. When the base is tinplate primed with an oleoresinous varnish, the maximum temperature which may used is 320° F. The maximum temperature when the base is blackplate is only 290° F. Thus, there is only a limited safety factor when the coating is baked for 6 minutes at 300° F. and decomposition occurs as evidenced by scorching when more elevated baking temperatures such as 350° F. are employed.

Attempts have been made to improve the properties of copolymers of vinyl chloride and vinylidene chloride. Along this line, small proportions of Bakelite's "Vinylite VMCH," which has a specific viscosity of 0.53 determined in 1.0% solution in cyclohexanone at 20° C. and which contains about 86% vinyl chloride, 1% maleic acid, and 13% vinyl acetate, has been included. The inclusion of the said "VMCH" improved adhesion to metal but the resistance to water and fabrication remained poor. Attempts have also been made to improve the copolymers of vinyl chloride and vinylidene chloride by the inclusion therein of acid hydrolyzed copolymers of vinyl chloride and vinyl acetate containing a major proportion of vinyl chloride component. A typical resin of this type is "VAGH" which is a copolymer having a specific viscosity of 0.57 determined in a 1.0% solution in cyclohexanone at 20° C. and containing 87% vinyl chloride and 13% vinyl acetate hydrolyzed in acid medium to a vinyl alcohol content of 4–6%. However, the inclusion of the acid hydrolyzed copolymer did not improve the dry adhesion except when high baking temperatures such as 350° F. were employed and the thermal stability at 350° F. was poor. Wet adhesion also remained poor and even at a 350° F. bake for 6 minutes a score of only 6 out of 10 was achieved. Blush resistance was also only fair.

The copolymers of vinyl chloride and vinylidene chloride which are modified in accordance with the present invention are copolymers containing vinyl chloride in an amount of from about 30% to about 75% by weight of the copolymer, with the balance of the copolymer being vinylidene chloride. Outside of this range of proportions, at either end of the range, the solubility characteristics of the copolymer in organic solvents become poor and the copolymer is unsuitable for the purposes of the invention.

The vinyl chloride-vinylidene chloride copolymers of the invention are preferably free of homopolymers of vinyl chloride and vinylidene chloride, and are characterized by complete solubility in xylene at 25% solids concentration, and by a specific viscosity of about 0.12 to about 0.30, as determined at 25° C., using a 0.4% solution of the resin in nitrobenzene. A specific viscosity below the stated range is an indication of brittleness of the fused resin, and above the stated range is an indication of excessively high solution viscosity for coating purposes.

The solvents used to dissolve the vinyl chloride-vinylidene chloride copolymers to provide a solvent solution for coating, can consist entirely of one or a mixture of liquid mononuclear aromatic hydrocarbon solvents, i.e., benzene, toluene, xylene, and their higher boiling homologs, such as ethyl benzene and isopropyl benzene. Mixed commercial aromatic hydrocarbon solvents are also suitable. Of all of the available solvents, toluene and xylene, and mixtures thereof, are preferred. Full solubility of the resin in solvent consisting solely of liquid aromatic hydrocarbon solvents can be obtained with solids concentrations of the resin as high as about 50% on a dry weight basis in such solvents. By varying such solids concentration from a minimum of about 15%, suitable coating viscosities may be obtained. For practical purposes, a range of about 25% to about 35% resin solids in the solvent solution is preferred.

The viscosity of the vinyl chloride-vinylidene chloride copolymers of the invention, when dissolved in suitable solvents will vary depending upon many factors. For a preferred copolymer such as "Geon 222" dissolved in xylene, a solution of 20 parts by weight of copolymer in 80 parts of xylene, has a viscosity of about 22 seconds in #4 Ford cup at 80° F.; and a solution of 32 parts of "Geon 222" in 68 parts of toluene has a viscosity of about 200 seconds in #4 Ford cup at 80° F. Geon 222 is a copolymer of 60 parts of vinyl chloride and 40 parts of vinylidene chloride which is completely soluble in xylene at 25% solids and is supplied as a copolymer having a specific viscosity of 0.15 determined at 20° C. in a 0.4% solution in pure nitrobenzene.

The aromatic hydrocarbon solvents preferred because of their low cost for the purposes of the invention can be replaced in whole or in part by more active organic solvents for vinyl polymers, such as ketone and ester solvents, e.g., methyl ethyl ketone, methyl isobutyl ketone, cyclohexanone, isophorone, ethyl acetate and butyl propionate. Small amounts of up to about 2% of alcohols may also be used for such purposes as assisting in filtration of the solution. Use of less than 75% by weight of aromatic hydrocarbon solvent based on the total solvent weight is not preferred. The addition of active ketone solvent, e.g., methyl ethyl ketone or isophorone, assists in the attainment of low viscosity high solids solutions containing substantial amounts of the alkaline hydrolyzed vinyl chloride-vinyl acetate copolymer, particularly where the latter material is present in amounts of more than about 7%.

EXAMPLE I

An example of a copolymer of vinyl chloride and vinylidene chloride usable in accordance with the invention, is made as follows: 82 parts of vinyl chloride and 18 parts of vinylidene chloride are placed together in a glass container at 20° C. and exposed, with agitation, to ultraviolet light, such as may be provided with a 100 watt G.E.-7 mercury vapor lamp. After 36 to 72 hours of such treatment, the resulting mixture of copolymer and unreacted monomers is removed from the container and dried to remove the unreacted monomers. A copolymer of approximately 60% vinyl chloride and 40% vinylidene chloride is obtained.

Copolymers with other ratios of vinyl chloride and vinylidene chloride content may be prepared in a like manner by varying the proportions of the starting charges of vinyl chloride and vinylidene chloride. Other methods of producing a usable copolymer may be employed, such as the above method without ultraviolet light but with a catalyst, such as benzoyl peroxide, and, if necessary, with subsequent filtration to remove the homopolymers which are not soluble in aromatic hydrocarbon solvent.

An example of suitable commercially available copolymer of vinyl chloride and vinylidene chloride is "Geon 222," which has been described hereinbefore.

The alkaline saponified copolymers of vinyl chloride and vinyl acetate which are employed in accordance with the present invention contain from about 80–92% by weight of vinyl chloride components. These copolymers having been saponified while in suspension in alkaline alcoholic medium in order to convert a portion of the vinyl acetate to vinyl alcohol to produce at least about 2% and preferably at least 3% by weight of vinyl alcohol and to dehydrohalogenate the copolymer to produce an average unsaturation of at least about 1.0 double bond per copolymer molecule. Preferred partially saponified copolymers have a corrected iodine number from 2 to 10. The conversion of vinyl acetate or other fatty acid ester in the copolymer molecule to vinyl alcohol should not exceed 85% and is preferably less than 78%, particularly where the copolymer is of low molecular weight.

Preferably, saponification of the vinyl chloride-vinyl acetate copolymers is effected by saponifying the copolymer in solid, finely divided form suspended in alcohol medium with a limited concentration of a strongly basic material so that a limited vinyl alcohol content can be accompanied by substantial unsaturation in the substantial absence of degradation. The saponified copolymer preferably is washed with alcohol and water to a salt content of less than 1% by weight. The predominant unsaturation in the copolymer is polyene unsaturation which is not necessarily conjugated and preferred copolymers contain at least 3 double bonds per copolymer molecule in a major proportion of the copolymer molecules which are present.

The copolymers of vinyl chloride and vinyl acetate which are employed in accordance with the invention possess a molecular weight in the range of about 5,000–20,000. The copolymers may be saponified to a maximum vinyl alcohol content of about 10% by weight. Preferably, the vinyl alcohol content does not exceed 6% by weight.

When vinyl chloride-vinyl acetate copolymers containing 90–92% by weight of vinyl chloride are employed, it is preferred to employ copolymers of lower molecular weight (below about 12,000, preferably below 9,000) to insure optimum compatibility with the copolymer of vinyl chloride and vinylidene chloride.

The alkaline suspension saponified copolymers of vinyl chloride and vinyl acetate are employed in admixture with copolymers of vinyl chloride and vinylidene chloride in an amount of from about 3% to 25% by weight based on the weight of the mixture. Preferably, at least about 7% by weight of the alkaline saponified copolymer of vinyl chloride and vinyl acetate is employed. Normally, it is not necessary to employ more than about 20% by weight of the partially saponified copolymer of vinyl chloride with vinyl acetate based on the weight of the mixture thereof with copolymers of vinyl chloride and vinylidene chloride.

It is to be particularly noted that the acid hydrolyzed copolymers are not the equivalent of the alkaline saponified copolymers of the invention because the acid hydrolyzed copolymers are not unsaturated. Also, these acid hydrolyzed copolymers do not produce the advantages of the present invention.

The solution hydrolyzed or saponified copolymers in alkaline medium are not the equivalent of the suspension saponified products which are used in the invention because the products obtained by reaction in solution are not unsaturated and are thermally unstable. Further, the products produced in solution are not compatible generally with copolymers of vinyl chloride and vinylidene chloride.

In accordance with preferred practice of the present invention, a copolymer of a vinyl halide, preferably vinyl chloride, with a vinyl fatty ester, preferably vinyl acetate, is saponified in the form of a slurry of the solid, finely divided copolymer in a substantially anhydrous liquid medium containing a lower aliphatic alcohol, for example, methanol, and saponification is effected employing a strongly basic material selected from the group consisting of alkali metal hydroxides, alkali metal alcoholates and quaternary ammonium hydroxides. The strongly basic material is normally employed in small concentration and stoichiometric quantities of strongly basic material are used based on the desired conversion to vinyl alcohol and removal of hydrogen chloride.

The preferred procedure is to heat the slurry at a temperature ranging from about 60° C. to about 80° C. to convert the desired proportion of vinyl acetate to vinyl alcohol and to produce the desired unsaturation.

The alkaline saponified copolymers which are employed are described at length in the copending application of Xavier V. Laporta, filed October 24, 1957, Serial No. 692,033, now Patent No. 3,021,318, the disclosure of which is hereby incorporated. In the said Laporta application it is indicated that the saponification reaction normally requires a reaction period of at least one quarter hour, that the copolymer is dispersed in the alcoholic medium in the form of fine particles to produce slurries containing from 15% to 60% by weight of solid material based on the weight of the liquid organic medium and that the concentration of strongly basic material be between 0.018 and 0.18 mol pound of alkaline hydroxide per 100 pounds of slurried saponifiable resin. It is further indicated that the saponified product is thoroughly washed, preferably by successive alcohol and water washes, to reduce the salt concentration to less than one percent by weight.

A preferred alkaline suspension saponified copolymer of vinyl chloride and vinyl acetate for use in accordance with the present invention is produced in the following manner:

EXAMPLE II 12 pounds of "Vinylite VYLF" (a copolymer of vinyl chloride with vinyl acetate in a weight ratio of 87:13 having an intrinsic viscosity at 20° C. in 1.0% solution in cyclohexanone of 0.24, a specific gravity of 1.34 and a particle size range of 150–250 microns) were slurried in 24 pounds of anhydrous methanol in the presence of 0.43 pound of C.P. potassium hydroxide and heated with stirring at 63° C. for 3 hours. The supernatant liquid was then removed and the saponified resin particles were washed successively with methanol and then with cold water. Each wash had twice the volume of the supernatant liquid which was removed. The final resin had a vinyl alcohol content of 5.0% and contained substantial unsaturation (corrected iodine number of about 3).

In the description which follows various test results are presented and unless otherwise specified all parts are by weight and the resinous component was dissolved in solvent in a weight ratio of resinous component to solvent of 25:75, the solvent being a xylene-methyl ethyl ketone mixture of weight ratio 80:20. The solutions so produced were tested by roller coating and baking, the dry coating weights being 4–5 mg. per sq. in. Various test specimens were employed, the designation ETP referring to unprimed electrolytic tinplate, the designation BP referring to blackplate and the designation primed ETP referring to electrolytic tinplate primed with an oleoresinous primer which will hereinafter be more specifically designated. The baking time was 6 to 6½ minutes and the temperature of the bake will be hereinafter specified.

The following Table I illustrates the improvement in both dry adhesion and also pasteurization wet adhesion which is achieved at various baking temperatures (6 minute bake) as a result of the inclusion of alkaline suspension saponified vinyl chloride-vinyl acetate polymers.

Table I
IMPROVED ADHESION USING SAPONIFIED VINYL CHLORIDE-VINYL ACETATE COPOLYMER

| (Base=ETP) | Geon 222 | | Geon 222 + Alkaline Saponified (VYLF) (EX. II) (90:10) | | Geon 222 + VAGH (90:10) | |
|---|---|---|---|---|---|---|
| Baking Temp. | 300° F. | 350° F. | 300° F. | 350° F. | 300° F. | 350° F. |
| Wet Adhesion:[1] A—Water | 0 | 0 | 10 | 9 | Not compatible. | |
| B—Water Vapor | 0 | 0 | 10 | 9 | Do. | |
| Dry Adhesion | 3 | 0 | 9 | 10 | Do. | |

[1] After pasteurization at 170° F. for 45 minutes.
10=perfect.

The increase in adhesion which is observed as indicated in Table I is particularly surprising when it is noted that the copolymer of vinyl chloride and vinylidene chloride possesses substantially no adhesion to unprimed electrolytic tinplate and when it is further noted that the acid hydrolyzed vinyl chloride-vinyl acetate copolymer is not compatible. On the other hand, the inclusion of the alkaline saponified copolymer of Example I produced superior adhesion irrespective of baking temperature.

The thermal stability of copolymers of vinyl chloride and vinylidene chloride when modified with alkaline saponified vinyl chloride-vinyl acetate copolymers is excellent at 300° F. but is less than perfect at more elevated baking temperatures as can be seen in Table II which illustrates the improvement which can be achieved by the inclusion in the modified copolymer of vinyl chloride and vinylidene chloride of a small proportion of a solvent-soluble etherified polyamine resin such as the butylated trimethylol melamine described in Example III.

The etherified low molecular weight amino resin which is employed in accordance with the invention is prepared by etherifying the polymethylol condensation product of a polyamine selected from the group consisting of urea, melamine and benzo guanamine with a molar excess of formaldehyde and with an excess of a primary saturated monohydric alcohol containing from 3 to 8 carbon atoms in the presence of an acid catalyst, whereby the plurality of free methylol groups produced by said condensation are etherified by said alcohol to provide a solution of said condensation product in the alcohol medium provided by the excess alcohol.

A preferred amino resin is butylated trimethylol melamine resin and may be prepared as follows:

EXAMPLE III 250 parts of 37% aqueous formaldehyde (3 mols) are charged into a kettle and the pH adjusted to pH 8 with ammonium hydroxide. 126 parts of melamine (1 mol) were then added and the mixture heated to 80° C. with agitation until all of the melamine had been dissolved. The resulting syrup was poured into trays for cooling and the product solidified after 5 hours. The solidified product was then crushed and dried at 50° C. for ten hours to a moisture content of 2–3% and the dry product was then ground to provide trimethylol melamine in the form of a fine powder.

The dry powdered trimethylol melamine was then heated to liquefy the same and 222 parts of n-butanol (3 mols) were added, followed by enough phosphoric acid to bring the pH to pH 5.5 and the mixture was boiled for 30 minutes. The reaction mixture was then concentrated under vacuum at 60–70° C. at a pressure of 100–200 mm. Hg and at a pH of 5.5–6.5, the distillate being an azeotropic mixture of butanol and water. The dehydrated resin was diluted with butanol and xylene to provide a 50% resin solids solution in solvent consisting of xylene and butanol in a weight ratio of 20:80.

*Table II*

IMPROVEMENT AT ELEVATED TEMPERATURE USING A SOLVENT SOLUBLE ETHERIFIED POLYAMINE RESIN

| (Base ETP) | Geon 222 | | Geon 222 + Alkaline Hydrolyzed VYLF (00:10) (EX. II) | | Geon 222 + Alkaline Saponified VYLF (EX. II) Butylated Trimethylol Melamine Resin (Ex. III) (00:10:2) | |
|---|---|---|---|---|---|---|
| Baking Temp | 300° F. | 350° F. | 300° F. | 350° F. | 300° F. | 350° F. |
| Thermal Stability | 10 | 7 | 10 | 8 | 10 | 10 |

10 = perfect (no burning).

There are various important conclusions which may be drawn from the information presented in Table II. First, it will be observed that the alkaline hydrolyzed copolymer scores a perfect ten with respect to thermal stability at 300° F. over the 6 to 6½ minute bake which is employed. Accordingly, the superior adhesion which is achieved at 300° F. bake as shown in Table I can be achieved while simultaneously avoiding thermal deterioration. At 350° F. the thermal stability of the alkaline saponified copolymer in admixture with the vinyl chloride-vinylidene chloride copolymers of the invention is somewhat less than perfect but it is still better than the thermal stability at 350° F. when the alkaline saponified copolymer is omitted.

Table II further demonstrates that the inclusion of the etherified amine resin, for example, butylated trimethylol melamine resin in small proportions (normally from about 1 to about 5% by weight) in accordance with the present invention, increases the thermal stability of the mixture containing the alkaline saponified copolymer to the point where a perfect score of 10 is achieved when baking at 350° F.

The question of thermal stability is not entirely resolved by merely comparing the results achieved by a 6 minute bake because it is also important that the baking operation include a safety factor. On occasion, the coatings which are baked remain in the oven for a period of time longer than six minutes or the temperature within the oven may rise above the desired predetermined temperature. When this occurs, it is important that there exist margin for error. Copolymers of vinyl chloride and vinylidene chloride, even though they may be baked at 300° F. without scorching, blistering, or discoloration for six minutes, will thermally deteriorate to produce the aforementioned disadvantages if the baking period substantially exceeds the six minute period which is desired or if the oven temperature is 10 or 20° F. greater than is intended. The products of the present invention, including alkaline saponified vinyl chloride-vinyl acetate copolymer, are more thermally resistant in the sense that a given temperature can be withstood for a longer period of time, and a higher temperature can be withstood before substantial deterioration takes place. Thus, while Geon 222 per se, when baked at 300° F. has a safety factor of about 4 minutes at this temperature, the mixtures of the invention when baked at 300° F. have a greater resistance to excessive baking time and these may remain in the oven for as long as about 10 minutes after the six minute bake has been completed without any noticeable deterioration in the coating as a result of the excessively long bake.

It should be observed in Table I that "VAGH" is of higher molecular weight than the "VYLF" which is saponified in Example II. The enhanced thermal stability achieved by the invention is even more surprising when it is observed that this stability is obtained with polymers of lower molecular weight. "VYLF" and "VYHH" ("VYHH" has the same composition as "VYLF" but is of higher molecular weight) have been hydrolyzed in alkaline solution but the hydrolyzed products so produced were similar to "VAGH" from the standpoint that they did not produce a compatible film with Geon 222.

The inclusion of an etherified amine resin such as butylated trimethylol melamine resin or butylated dimethylol urea resin improves the resistance of the coating to process blush, particularly when vinyl chloride-vinylidene chloride copolymer is coated over oleoresinous phenol-aldehyde priming composition. Over this primer admixtures of vinyl chloride-vinylidene chloride copolymer with alkaline saponified vinyl chloride-vinyl acetate copolymer in the presence of etherified amine resin exhibit perfect adhesion both wet and dry at baking temperatures of 300° F. or 350° F. and perfect resistance to process blush. By contrast, the process blush resistance of copolymers of vinyl chloride and vinylidene chloride containing "VMCH" is only fair.

Priming compositions are generally employed and these may be oil-soluble resinous varnish materials, or epoxy resin compositions (70 parts—Epon 1007) modified with urea-formaldehyde resin (25 parts) and alkaline-condensed phenol-formaldehyde resin (5 parts) or acrylic resin primers as typified by copolymers of ethyl acrylate, methyl methacrylate and about 5% of glacial methacrylic acid with the acrylate/methacrylate monomers being in a weight ratio of about 3 to 2. Oil-soluble, heat-bodied, unsaturated, non-heat hardening, oil-modified resinous varnishes are preferred by reason of economy and availability.

Generally, the priming compositions as to which improved blush resistance is achieved, are oleoresinous phenol-aldehyde varnishes which are utilized in accordance with the invention particularly as primers for blackplate. The phenol-aldehyde resin is normally heated in a kettle with the unsaturated drying oil to dissolve the mixture, heat-bodied to the desired consistency and then thinned with solvent.

The drying oil constituent may include unsaturated drying oils such as fast drying oils having two or more conjugated double bonds per acid radical in the molecule, for example, chinawood oil, oiticica oil and dehydrated castor oil; medium drying oils having three or more non-conjugated double bonds per acid radical in the molecule, such as perilla oil, linseed oil, soya bean oil and the glycerides of the clupanodonic acid of fish oils; and semi-drying oils having two non-conjugated double bonds in an acid radical thereof such as poppyseed, rapeseed and sunflower seed oils.

When employing semi-drying oils, it is necessary to employ higher temperatures for heat-bodying, such as temperatures in the range of 400° F.–450° F. The mixture being heat-bodied is blanketed with an inert gas and the heat-bodying takes about 2 hours. The mixture must be carefully watched so that the cooking is stopped when the desired viscosity is reached.

The trade refers to phenolic varnishes as being short oil, medium oil or long oil varnishes to indicate the number of gallons of oil used per 100 pounds of resin. The preferred phenolic varnish primers employ short oil varnishes which contain from 6 to 18 gallons of oil per 100 pounds of resin. Preferably the lower portion of the short oil range is used, e.g., from 6 to 15 gallons of oil per 100 pounds of resin.

The oil-soluble, non-heat hardening phenol-aldehyde resin is the condensation product of an aldehyde, preferably formaldehyde, with a phenol containing only a single hydroxy group in each phenolic nucleus which may be present. The condensation is effected in aqueous alkaline medium. Paraformaldehyde and acetaldehyde, etc., may be used in place of formaldehyde. The mol ratio of aldehyde to phenol is from 0.75:1 to 2:1. The condensation is performed in the presence of an alkaline catalyst such as sodium hydroxide, ammonia, zinc oxide, morpholine, benzylamine, or other amine and the catalyst is normally present in an amount of about 1.0% by weight based on the weight of the phenol constituent.

The condensation is continued until the phenol-aldehyde reaction product has reached the non-heat hardening stage to produce a heat-non-reactive varnish. By a heat-non-reactive varnish is meant that there are sufficiently few free methylol groups in the phenol-aldehyde condensate as to avoid substantial further condensation during cooking with the oil.

The phenolic constituent of the phenol-aldehyde resin may be phenol itself or it may be phenol substituted in the ortho and/or para position with an alkyl or aryl or aralkyl substitutent. Thus, there may be used ortho or para cresol or mixed xylenols. The preferred phenolic constituent is para phenyl phenol. Para tertiary amyl phenol, para tertiary butyl phenol and para cyclohexyl phenol are also particularly desirable as the phenol constituent.

A drier, such as lead, cobalt, calcium, or manganese, resinate and/or naphthenate, etc., may be introduced into the oleoresinous varnish before the coating operation, to exercise its effect during the baking. One-twentieth percent of cobalt as cobalt naphthenate may, for example, be added to the oleoresinous varnish based on the weight of the oil, to accelerate the curing of the oleoresinous component.

EXAMPLE IV

An example of a preferred oleoresinous phenol-aldehyde varnish primer usable to produce a prime coat in accordance with the invention is made as follows:

20 parts of oil-soluble ortho cresol/formaldehyde resin and 20 parts of tung oil are mixed in an open varnish kettle and heated to 325° F. in about 15 minutes. The temperature is then raised to 380° F. and held for approximately 1.5 hours. The oleoresinous primer so produced is thinned with 60 parts of xylene and may be coated upon blackplate or tinplate and cured by baking for 10 minutes at 400° F.

The oil-soluble ortho cresol/formaldehyde resin referred to above was produced by condensing 1 mol of ortho cresol with 1 mol of formaldehyde in water solution containing 1% by weight, based on the weight of the cresol, of ammonium hydroxide. The solution was maintained at reflux temperature until the exothermic reaction ceased and refluxing was continued for three-quarters of an hour to insure completion of the reaction. Water was then removed by vacuum distillation to provide a hard and friable resin having a melting point of 160–180° F.

A particularly valuable commercial oleoresinous primer of the non-phenolic type, but still falling within the category of oil-soluble, non-heat hardening resinous varnishes, which are heat bodied with an unsaturated drying oil comprises rosin which has been heat reacted with a small proportion of an alpha-beta ethylenically unsaturated acid or anhydride such as maleic acid, maleic anhydride, citraconic acid or anhydride, itaconic acid or anhydride, etc., and with a polyhydric aliphatic alcohol, particularly glycerol. The modified rosin reaction product so produced is heatbodied with the same type of unsaturated drying oils as have been previously referred to with respect to the phenolic primers.

These rosin based oleoresinous primers are not generally usable to serve as a base for a topcoat comprising a copolymer of vinyl chloride and vinylidene chloride. Thus, Geon 222 alone or when modified by the inclusion therein of "VMCH," "VAGH," and even with the inclusion of the alkaline saponified copolymers of vinyl chloride and vinyl acetate in accordance with the present invention do not provide adequate adhesion either wet or dry with respect to the rosin-oleoresinous priming compositions.

In accordance with the present invention, it has been found that the inclusion of an etherified amino resin in mixtures containing a copolymer of vinyl chloride and vinylidene chloride together with partially saponified copolymers of vinyl chloride and vinyl acetate greatly improves the adhesion both wet and dry to the rosin-oleoresinous primed surface.

A specific example of a rosin-oleoresinous varnish primer is as follows:

EXAMPLE V

Gum rosin of color WW, a softening point of about 78–80° C., an acid value of 166+, and a saponification value of 170+ is reacted with maleic anhydride at a temperature of about 200–300° F. to incorporate about 10% by weight of maleic anhydride. The maleic anhydride is added slowly to the rosin which is heated and liquefied at a temperature of 200° F. The mixture is agitated and the temperature is carefully controlled between 250° and 350° F. to make sure that the maleic anhydride is reacted substantially as soon as it is dissolved in the rosin. After about half of the maleic anhydride is added, 20% by weight of glycerol based on the weight of the gum rosin is added and the temperature is raised slowly to about 400° F. The remainder of the maleic anhydride is then added and the polymerization is completed by raising the temperature to 475°–495° F.

The resin product so produced is then cooked with from 15 to 25 gallons of china-wood oil per 100 pounds of resin product at a temperature of 475° F.–550° F. until a clear supercooled bead can be produced by removing a drop of liquid from the hot mixture and cooling.

The cooked mixture is then cut back to 50% solids with aromatic solvents to provide an excellent priming composition.

The improvement which is produced employing a small quantity of etherified amine resin when the coating is applied to the blackplate primed with the primer of Example V, and then baked at 300° F. for six minutes is demonstrated in Table III which follows:

*Table III*

IMPROVEMENT WITH RESPECT TO ROSIN-OLEORESINOUS VARNISH PRIMED SURFACE

| Base=BP+Primer (EX. V) | Geon 222+Alkaline saponified VYLF (EX. II) (90:10) | | Geon 222+Alkaline saponified VYLF (EX. II)+Butylated Trimethylol Melamine Resin (90:10:2) | |
|---|---|---|---|---|
| Baking Temp | 300° F. | 350° F. | 300° F. | 350° F. |
| Dry Adhesion | 4 | 2 | 10 | 10 |
| Wet Adhesion [1] | 0 | 1 | 10 | 10 |
| Blush [1] | 9 | 9 | 10 | 10 |

[1] After pasteurization at 170° F. for 45 minutes.
10=perfect.

In the above Table III, it will be observed that the inclusion of about 2% by weight of an etherified amine resin such as butylated trimethylol melamine resin completely altered the adhesion of the top coat to the underlying base constituted by blackplate coated with the rosin-oleoresinous varnish of Example V.

Further, the addition of a small quantity, e.g., from about 1% to about 5% by weight of total resin, of a polyepoxide having a boiling point above 300° C. at normal atmospheric pressure to the mixture of vinyl chloride-vinylidene chloride copolymer and alkaline saponified vinyl chloride-vinyl acetate copolymer improves the thermal stability of the composition as a coating when subjected to temperatures of about 350° F., this temperature being within the baking range for the coating. Improvement in thermal stability is observed by absence of discoloration when the coating is subjected to longer than normal baking schedules (5–6 minutes) at temperatures of about 340–350° F.

This aforementioned addition of polyepoxide also enhances flexibility of the coating which is cured at the baking temperature while maintaining high adhesion to the underlying base. This addition is also of particular value in formulations of the invention containing etherified amino resins such as illustrated in Table III, since not only is the tendency towards discoloration at elevated temperatures (about 350° F.) due to thermal deterioration obviated but improved flexibility of the baked coating containing etherified resin is observed.

Thus, the presence of the polyepoxide lends added flexibility to these last named cured coatings and this flexibility is combined with improved adhesion to the underlying base to enhance the ability of coated metal articles to withstand fabrication. This is of particular importance in the fabrication of can ends where the deformation of a metal sheet having the baked on coating thereupon to produce a double fold for reception of the can body necessitates extensive deformation of the metal and the coating. The limited dry adhesion of the coating to the underlying base in the formulations containing amino resin but not polyepoxide leads to a tendency of the coating to separate from the base upon the extensive fabrication referred to in the production of the can end. It has been found that under these conditions of extensive fabrication that a substantially perfect score of about 10 can only be achieved by the inclusion of polyepoxide in the mixture of vinyl chloride-vinylidene chloride copolymer, alkaline saponified vinyl chloride-vinyl acetate copolymer and etherified amine resin such as butylated trimethylol melamine.

The polyepoxide may be any epoxide having a 1,2 epoxy equivalency in excess of 1.0 and sufficiently high molecular weight to be of low volatility during the baking operation. Preferably, the polyepoxide is a glycidyl ether or glycidyl ester having more than 1.0, preferably at least 1.4 and more preferably about two glycidyl groups with a terminal oxirane group therein per polyepoxide molecule.

The average molecular weight of the polyepoxide is at least about 300 preferably higher to provide minimum volatility and resistance to leaching in the cured film containing the same. For aromatic polyepoxides the preferred compositions desirably have a molecular weight in excess of about 600 to be particularly adapted to resist leaching when contact with foods and beverages is intended.

The boiling point of polyepoxides of comparable molecular weight varies with the structure of the backbone of the polyepoxide molecule. As previously pointed out, the improved resistance to fabrication which may take place either before or after subjection of the coated product to pasteurizing or processing conditions requires that the polyepoxide boil above 300° C. at normal atmospheric pressure.

The polyepoxide may be a polymerizable and copolymerizable higher fatty ester epoxide which is produced by the action of an epoxidizing agent on an unsaturated fatty ester of a polyhydric alcohol to produce a polymerizable epoxide of unsaturated fatty acid esters such as the triglycerides of the unsaturated long chain fatty acids. Peracetic acid may be used as the epoxidation agent.

Examples of unsaturated fatty acid esters which may be epoxidized to provide reactive epoxides which are co-reactive with the etherified amine resin component and the alkaline saponified vinyl copolymer in the presence of a vinyl chloride-vinylidene chloride copolymer are the following esters which are preferably employed in the form of the glyceride oils:

Oleic (9-octadecenoic)
Linoleic (9,12-octadecadienoic)
Linolenic (9,12,15-octadecatrienoic)
Eleostearic (9,11,13-octadecatrienoic)
Licanic (4-keto-9,11,13-octadecatrienoic)
Ricinoleic (12-hydroxy-9-octadecenoic)
Erucic (13-docosenoic)

The unsaturated oil is charged to a reaction vessel and peracetic acid is then added gradually to the oil. The temperature at which the reaction mixture can be maintained may vary within the limits of −10° C. to 75° C. although it is preferred that the temperature be maintained in the range of 25° C. to 50° C. The reaction conditions are maintained until an analysis for peracetic acid indicates that substantially all of the peracetic acid charged to the reaction has been consumed. The reaction time will vary usually from two to eight hours depending, of course, on the temperature and the concentration of the peracetic acid in the reaction vessel.

The unsaturated fatty acid ester and peracetic acid are ordinarily employed in such a manner as to provide from 10 to 25 mol percent excess of peracetic acid in the reaction mixture but more or less peracetic acid can be employed and even an excess of the unsaturated ester may at times be employed, if desired.

The peracetic acid is usually added to the reaction vessel as a solution of peracetic acid in an inert solvent such as, for example, acetic acid and the like.

After the reaction period is over, the reaction solution is worked up by removing the solvent and any excess acid is removed in any convenient manner, such as by washing.

The preferred polyepoxide is specifically illustrated in the example which follows:

EXAMPLE VI

To 315 parts (0.33 mol) of soya bean oil heated to 30° C. were added 457 parts (1.5 mols) of peracetic acid solution containing 24% by weight of peracetic acid in acetic acid. The peracetic acid was added from a dropping funnel in a period of about 2 hours while stirring and temperature is controlled between 35–45° C. After addition the reaction mixture was heated at 35–40° C. for an additional 3 hours. The reaction mixture was then extractively distilled at reduced pressure (5 mm. Hg). Ethyl benzene was added to the still, and acetone, acetic acid, unreacted peracetic acid and ethyl benzene were removed. The residue contained 352 parts of epoxidized soya bean oil.

The epoxidized unsaturated fatty ester may be replaced by other types of polyepoxide resins which are preferably of low to medium molecular weight. The polyexopide resins which are employed in accordance with the invention are those having a 1,2 epoxy equivalence greater than one. Preferred epoxides in accordance with the invention are polyethers which are preferably glycidyl ethers of a polyhydric material which may be aliphatic or aromatic but which are preferably binuclear aromatic compounds such as a bisphenol.

The simplest of the polyether epoxides are the diglycidyl diethers of dihydric phenols, such as p,p'-dihydroxydiphenyl-2,2'-propane (bisphenol A), or polyhydric alcohols, such as glycerine or pentaerythritol. The diglycidyl diethers of dihydric phenols have glycidyl radicals linked to the aromatic hydrocarbon radical by etheral oxygen atoms.

More preferably, the polyether is of resinous character and contains at least one aromatic hydrocarbon radical which is connected to a glyceryl group through an ether oxygen linkage, there being preferably provided a total of two such glyceryl groups each having a terminal oxirane group and a plurality of recurring aromatic groups interlinked through ether oxygens to an intervening aliphatic radical which may contain secondary hydroxyl groups as the sole reactive group and which may, if desired, contain internal ether groups.

As is known, the polyether is a complex mixture of compounds rather than being a single particular compound.

Any of the various dihydric phenols, or a mixture thereof, may be used in preparing the polyethers, including mono-nuclear phenols such as resorcinol, cathechol, hydroquinone, methyl resorcinol, etc.; or polynuclear phenols like p,p'-dihydroxy-diphenyl-2,2'-propane (bisphenol A), 4,4'-dihydroxybenzophenone, bis (4-hydroxyphenol) metane, 1,1'-bis (4-hydroxyphenyl) ethane, 1,1'-bis (4-hydroxyphenyl) isobutane, 2,2'-bis (3-hydroxyphenyl) butane, 2,2'-bis (4-hydroxy-2-methylphenyl) propane, 2,2'-bis (2-hydroxynaphthyl) pentane, 1,5-dihydroxy-naphthalene, etc. The preferred phenol is p,p'-dihydroxy-diphenyl-2,2'-propane.

The polyethers are prepared, in general, by heating at about 30° C. to 200° C. one or a mixture of dihydric phenols with epichlorohydrin, dichlorohydrin or mixtures thereof in a basic reaction medium. The preparation of polyglycidyl ethers of bisphenol having a 1,2 epoxy equivalency of about 2 and of various molecular weight is well known.

Polyepoxides having an aromatic backbone are preferred because aliphatic materials do not provide as good physical characteristics. A suitable aliphatic polyepoxide is polyether B described in the United States patent to F. E. Condo et al., No. 2,752,269.

Particularly preferred polyglycidyl ethers of bisphenol A in accordance with the present invention and having a 1,2 epoxy equivalency of substantially 2.0 are those having a molecular weight in the range of from about 360 to about 1200. These resins have an epoxy value of about 0.15 to 0.5. The epoxy value may be defined as the number of mols of epoxy groups in 100 grams of polyepoxide resin component. Although epoxide resins falling within the narrow molecular weight range of from 600 to 1200 and having a 1,2 epoxy equivalency of at least 1.4 and more preferably about 2, are particularly preferred, polyglycidyl ethers of bisphenol A having a 1,2 epoxy equivalency in excess of 1.0 and a molecular weight in the range of from about 360 to about 6000, may be used to advantage.

A polyepoxide of relatively low molecular weight (350–370) and having an epoxy value of about 0.5–0.54 which may be employed in accordance with the present invention may be prepared in accordance with the instructions set forth in the section designated "Polyether A" in the United States patent to B. C. Shokal et al., No. 2,643,239, dated June 23, 1953. In this manner there is provided liquid polyepoxides of minimum molecular weight using bisphenol A and a large excess of epichlorohydrin. By reducing the molecular excess of epichlorohydrin, products of somewhat higher molecular weight may be obtained.

A further liquid polyepoxide resin which may be used is the reaction product of bisphenol A and epichlorohydrin having a molecular weight of 390 and an epoxy value of 0.54. By reducing the mol ratio of epicholorhydrin to bisphenol A to a value of less than 2:1, still higher molecular weight products may be achieved. A polyepoxide having a molecular weight of 630 and an epoxy value of 0.26 and produced by reaction of bisphenol A and epichlorohydrin may also be employed. Similar polyepoxide resins having a molecular weight of about 530 and an epoxy value of 0.38 or one having a molecular weight of about 1000 and an epoxy value of 0.20 are also well adapted to use in the invention. The molecular weights referred to above will be understood to refer to average molecular weight.

In accordance with the invention, polyepoxide resins of intermediate molecular weight such as those having an average molecular weight of 1,850 and an epoxy value of 0.11 may be used. Polyepoxide resins of higher molecular weight, e.g., having a molecular weight of about 3800 and an epoxy value of 0.05 may also be used despite the formation of a cloudy solution since the solution clears upon baking to provide acceptable film clarity.

The polyepoxide resin which is employed preferably contains at least 1.4 and more preferably about 2 terminal oxirane groups per molecule since these are more reactive and lead to the achievement of a tight cure during the baking operation.

In the following Table IV, the wet and dry adhesion (the wet adhesion reported is a combined figure averaging the effect of both liquid water and water vapor) are reported for various coatings upon blackplate primed with the primer of Example V, the reported adhesion being the adhesion observed after the blackplate had been fabricated with the coatings baked thereon at 350° F. into a can end having a double fold for the reception of a can body.

*Table IV*

IMPROVED ADHESION AFTER FABRICATION INTO CAN END HAVING DOUBLE FOLD

| B.P. Primed with Primer EX. V | Dry Adhesion | Wet Adhesion[1] |
|---|---|---|
| Geon 222 | 0 | 0 |
| Geon 222+"VMCH" | 2 | 0 |
| Geon 222+Alkaline Saponified Copolymer (EX. II) (90:10) | 4 | 0 |
| Geon 222+Alkaline Saponified Copolymer (EX. II)+Butylated Trimethylol Melamine Resin (EX. III) (90:10:2) | 4 | 8 |
| Geon 222+Alkaline Saponified Copolymer (EX. II)+Butylated Trimethylol Melamine Resin (EX. III)+Epoxide Plasticizer (EX. VI) (90:10:2:2) | 9 | 8 |

[1] After pasteurization at 170° F. for 45 minutes.

10=perfect.

To illustrate the excellent results which may be achieved by the inclusion of various polyepoxide resins and particularly by the inclusion of glycidyl polyethers of bisphenol A, the results obtained with various commercially available resins of this type are set forth in Table V. Each composition tested contained Geon 222, alkaline saponified copolymer of Example II, butylated trimethylol melamine resin of Example III and a polyepoxide which varied from sample to sample with the specific polyepoxide used in each instance being reported in the table. The proportions by weight of the various components of the compositions in the order listed above is 90:10:2:2. The tests were made by application of the coating composition to 0.25#/85# electrolytic tinplate with each composition being baked for six minutes at 300° F.

*Table V*

IMPROVED ADHESION AND BLUSH RESISTANCE USING GLYCIDYL POLYETHERS OF BISPHENOL A

| Polyepoxide Component | Clarity | | Dry Adhesion | Blush[1] | | Wet Adhesion[1] | |
|---|---|---|---|---|---|---|---|
| | Solution | Film | | Liquid | Vapor | Liquid | Vapor |
| Example VI | 9 | 10 | 10 | 8 | 8 | 5 | 10 |
| Epon 828 | 9 | 10 | 10 | 8 | 10 | 10 | 10 |
| Epon 864 | 9 | 10 | 10 | 9 | 10 | 10 | 10 |
| Epon 1001 | 9 | 10 | 10 | 7 | 10 | 10 | 10 |
| Epon 1007 | 1 | 9 | 10 | 7 | 10 | 10 | 10 |

[1] After pasteurization at 170° F. for 45 minutes.

10=perfect.

As will be seen in Table V, the various glycidyl polyethers of bisphenol A produce excellent adhesion and resistance to water at elevated temperature.

Other types of polyepoxides may be employed, although the use of polyglycidyl ethers of bisphenol are outstanding with respect to adhesion after contact with liquid water at elevated temperature. Thus, a copolymer of ethyl methacrylate, glycidyl methacrylate and acrylonitrile in weight proportions of 74–10–15 prepared by solvent solution polymerization at a temperature of about 80–100° C. in the presence of a free-radical polymerization catalyst such as an organic peroxide (benzoyl peroxide, for example) may be used. Desirable results can also be achieved using polyepoxides such as a mixture which contains about 92% by weight of

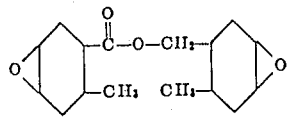

in which the 1,2 epoxy groups are cyclohexyl epoxy groups. The remaining 8% is a mixture of products similar to that pictured above and in which oxidation has proceeded excessively or in which only a single cyclohexyl epoxy group is formed as a result of insufficient epoxidation.

Suitable catalysts and/or driers may be employed. Thus, a small proportion, for example, up to about 1%–5% of a peroxy catalyst, notably benzoyl peroxide may be used with advantage although other known organic peroxides may be employed in place of the more commonly used benzoyl peroxide.

Similar quantities of driers may also be included in the coating composition, for example, up to 1%–5% of lead, cobalt, calcium, or manganese resinate and/or naphthenate, etc. Cobalt naphthenate is a particularly preferred drier which may be used in an amount of about 2% by weight based on the weight of resin solids in the coating composition.

The invention is defined in the claims which follow.

We claim:

1. A solvent solution comprising an organic solvent containing dissolved therein a copolymer of vinyl chloride and vinylidene chloride containing vinyl chloride in an amount of from about 30% to about 75% by weight of the copolymer and the balance of said copolymer being vinylidene chloride, and a minor proportion with respect to said vinyl chloride/vinylidene chloride copolymer of a partially saponified copolymer of vinyl chloride and vinyl acetate containing from 80% to 92% by weight of vinyl chloride, said vinyl chloride saponified copolymer being prepared by saponification of copolymer suspended in alcoholic medium in the presence of a limited proportion of strongly basic material to provide a vinyl alcohol content of from about 2% to about 10% by weight and an average unsaturation of at least about 1.0 double bond per copolymer molecule and being present in an amount of from about 3% to about 25% by weight based on the weight of said mixture of copolymers.

2. A solvent solution as recited in claim 1 in which said copolymer of vinyl chloride and vinylidene chloride is completely soluble in xylene at 25% solids and has a specific viscosity of about 0.12 to about 0.30 determined at 25° C. using a 0.4% solution in nitrobenzene.

3. A solvent solution as recited in claim 1 in which said saponified copolymer of vinyl chloride and vinyl acetate has a vinyl alcohol content of less than 6% by weight.

4. A solvent solution as recited in claim 1 in which said solution includes from about 1% to about 5% by weight based on resin solids of an ether prepared by etherifying the polymethylol condensation product of a polyamine selected from the group consisting of urea, melamine and benzo guanamine with a molar excess of formaldehyde with a primary saturated monohydric alcohol containing from 3 to 8 carbon atoms in the presence of an acid catalyst.

5. A solvent solution as recited in claim 4 in which said solution includes from about 1% to about 5% by weight based on resin solids of a polyepoxide having a 1,2 epoxy equivalency greater than 1.0, a molecular weight in excess of 300 and a boiling point at normal atmospheric pressure in excess of 300° C.

6. A solvent solution comprising an organic solvent comprising at least about 75% by weight of a mononuclear aromatic hydrocarbon solvent, said organic solvent containing dissolved therein a mixture of copolymers comprising a copolymer of vinyl chloride and vinylidene chloride containing vinyl chloride in an amount of from about 30% to about 75% by weight of the copolymer and the balance of said copolymer being vinylidene chloride and a partially saponified copolymer of vinyl chloride and vinyl acetate containing from 80% to 92% by weight of vinyl chloride, said saponified copolymer being prepared by saponification of copolymer suspended in alcoholic medium in the presence of a limited proportion of strongly basic material to provide a vinyl alcohol content of from about 2% to about 10% by weight and an average unsaturation of at least about 1.0 double bond per copolymer molecule.

7. A solvent solution as recited in claim 6 in which said saponified copolymer of vinyl chloride and vinyl acetate is dehydrohalogenated to provide a corrected iodine number of from 2 to 10.

8. A solvent solution as recited in claim 6 in which said copolymer of vinyl chloride and vinyl acetate is saponified while suspended in the form of solid particles in a liquid medium comprising lower aliphatic alcohol by means of a strongly basic material selected from the group consisting of alkali metal hydroxides, alkali metal alcoholates and quaternary ammonium hydroxides in a concentration between 0.018 and 0.18 mol pounds of alkaline hydroxide per 100 pounds of saponifiable copolymer, said liquid medium containing from 15% to 60% of solid copolymer dispersed therein.

9. A solvent solution as recited in claim 6 in which said solvent solution contains at least about 7% by weight of said saponified copolymer of vinyl chloride and vinyl acetate based on the weight of the mixture of copolymers.

10. A solvent solution comprising an organic solvent containing dissolved therein a copolymer of vinyl chloride and vinylidene chloride, said copolymer being aromatic hydrocarbon-soluble as characterized by complete solubility in xylene at 25% solids, and a minor proportion with respect to said vinyl chloride/vinylidene chloride copolymer of a partially saponified copolymer of vinyl chloride and vinyl acetate containing from 80% to 92% by weight of vinyl chloride, said partially saponified copolymer being prepared by saponification of copolymer suspended in alcoholic medium in the presence of a limited proportion of strongly basic material to provide a vinyl alcohol content of from about 2% to about 10% by weight and an average unsaturation of at least about 1.0 double bond per copolymer molecule and being present in an amount of from about 3% to about 25% by weight, based on the weight of said mixture of copolymers.

11. A solvent solution as recited in claim 10 in which said solution includes from about 1% to about 5% by weight, based on resin solids, of an etherified amine resin, said etherified amine resin being a solvent-soluble ether of a primary saturated monohydric alcohol containing from 3 to 8 carbon atoms with the low molecular weight amine resin formed by condensing a polyamine with a molar excess of formaldehyde.

12. A solvent solution comprising liquid mononuclear aromatic hydrocarbon solvent as essential solvating medium and containing dissolved therein a mixture of copolymers comprising a copolymer of vinyl chloride and vinylidene chloride containing vinyl chloride in an amount of from about 30% to about 75% by weight of the copolymer and the balance of said copolymer being vinylidene chloride and a partially saponified copolymer of vinyl chloride and vinyl acetate containing from 80% to 92% by weight of vinyl chloride, said saponified copolymer being prepared by saponification of copolymer suspended in alcoholic medium in the presence of a limited proportion of strongly basic material to provide a vinyl alcohol content of from about 2% to about 10% by weight and an average unsaturation of at least about 1.0 double bond per copolymer molecule.

References Cited in the file of this patent

UNITED STATES PATENTS

| | | |
|---|---|---|
| 1,921,326 | Robertson | Aug. 8, 1933 |
| 2,453,308 | Dunlop | Nov. 8, 1948 |
| 2,459,125 | Cheyney | Jan. 11, 1949 |
| 2,464,290 | Bowen | Mar. 15, 1949 |
| 2,479,409 | Roedel | Aug. 16, 1949 |
| 2,483,959 | Baer | Oct. 4, 1949 |
| 2,512,726 | Penn et al. | June 27, 1950 |
| 2,536,114 | Weaver | Jan. 2, 1951 |
| 2,595,953 | Kunze et al. | May 6, 1952 |
| 2,605,248 | Fisk | July 29, 1952 |
| 2,675,334 | Gray et al. | Apr. 13, 1954 |
| 2,780,564 | Gray et al. | Feb. 5, 1957 |
| 2,793,141 | Barr | May 21, 1957 |
| 2,941,974 | Reymann et al. | June 21, 1960 |

FOREIGN PATENTS

| | | |
|---|---|---|
| 565,633 | Germany | Dec. 3, 1932 |
| 659,042 | Germany | Apr. 22, 1938 |